United States Patent
Nardo

(10) Patent No.: US 10,167,237 B2
(45) Date of Patent: Jan. 1, 2019

(54) PROCESS AND A PLANT FOR OXIDATIVE BIOSTABILIZATION OF CITRUS PULP

(71) Applicant: Fabrizio Nardo, Barga-Lucca (IT)

(72) Inventor: Fabrizio Nardo, Barga-Lucca (IT)

( * ) Notice: Subject to any disclaimer, the term of this patent is extended or adjusted under 35 U.S.C. 154(b) by 215 days.

(21) Appl. No.: 14/906,457

(22) PCT Filed: Jul. 29, 2014

(86) PCT No.: PCT/IB2014/001469
§ 371 (c)(1),
(2) Date: Jan. 20, 2016

(87) PCT Pub. No.: WO2015/019158
PCT Pub. Date: Feb. 12, 2015

(65) Prior Publication Data
US 2016/0152524 A1    Jun. 2, 2016

(30) Foreign Application Priority Data

Aug. 5, 2013    (IT) .................... FI2013A0188

(51) Int. Cl.
*C05F 11/00*    (2006.01)
*C05F 17/00*    (2006.01)
(Continued)

(52) U.S. Cl.
CPC .............. *C05C 11/00* (2013.01); *B01J 19/18* (2013.01); *B01J 19/24* (2013.01); *B01J 19/245* (2013.01);
(Continued)

(58) Field of Classification Search
None
See application file for complete search history.

(56) References Cited

U.S. PATENT DOCUMENTS 3,761,237 A * 9/1973 Jeffreys ..................... C05F 9/04
71/9
6,224,771 B1 * 5/2001 Takeshima ................ C05F 3/00
210/610
(Continued)

FOREIGN PATENT DOCUMENTS

EP    0581992 A1    2/1994
EP    1149805 A1    10/2001

OTHER PUBLICATIONS

Ievlev O K; Serbulov A Yu; Zenikov V I, "Method of compost production involves mixing of dosed components, introducing microbiological supplement, supplying the mix into a fermenter and following by aerobic composting with ventilation", WPI / Thomson, Nov. 20, 2008, vol. 2009, Nr:3, Nov. 20, 2008, abstract.

(Continued)

*Primary Examiner* — Wayne A Langel
(74) *Attorney, Agent, or Firm* — David Guerra

(57) ABSTRACT

A process for oxidative biostabilization of citrus pulp, comprising the following steps: feeding an amount of fresh citrus pulp, mixing said amount of fresh pulp with an amount of partially biostabilized pulp, setting the reaction mixture in a first open-chamber reactor (3) for oxidative biostabilization in air, causing the mixture to advance along said reactor (3) guaranteeing the homogeneity thereof, blowing in air from beneath into said first reactor (3), and transferring a partial mass of the mixture from an area close to or downstream of the outlet end (6) to an area upstream of the mixer.

15 Claims, 1 Drawing Sheet

(51) Int. Cl.
  *C10L 5/44*   (2006.01)
  *B01J 19/18*  (2006.01)
  *C05C 11/00*  (2006.01)
  *C05F 11/08*  (2006.01)
  *C05F 17/02*  (2006.01)
  *B01J 19/24*  (2006.01)

(52) U.S. Cl.
  CPC .......... *C05F 11/08* (2013.01); *C05F 17/0018* (2013.01); *C05F 17/0217* (2013.01); *C05F 17/0264* (2013.01); *C10L 5/445* (2013.01); *B01J 2219/24* (2013.01); *C10L 2200/0469* (2013.01); *Y02E 50/10* (2013.01); *Y02E 50/30* (2013.01); *Y02P 20/145* (2015.11); *Y02W 30/43* (2015.05)

(56) References Cited

U.S. PATENT DOCUMENTS

| | | | |
|---|---|---|---|
| 7,334,345 B2 | 2/2008 | Lasonde | |
| 2007/0163316 A1* | 7/2007 | Fedkenheuer | ............ C05C 9/00 71/11 |

2013/0167602 A1   7/2013   Blake

OTHER PUBLICATIONS

Han Chul I; Han S; Im H; Jae Ho J; Jeon S; Jwa J; Kyoung Hwan M; Moon G; Seung Gab H; Seung Jong J , "Novel Bacillus amyloliquefaciens strain for use in composting citrus tree by-product, has cellulose resolving and antibacterial activation activities", WPI / Thomson, May 20, 2009, vol. 2009, Nr:66, KR20090050789A A, May 20, 2009, abstract.

Guo B; Lu Z; Mi L; Zhong B, "Biological organic fertilizer comprises citrus peel, rice, wooden meal, Stevia ebaudiana residue, livestock and poultry manure and fertilizer and biological strain", WPI / Thomson, Nov. 23, 2011, vol. 2012, Nr:30, Nov. 23, 2011, abstract.

Iwami Y; Nakamura K; Sakai K, "Manufacture of organic fertilizer by processing fruit waste material of high organic acid concentration or low pH with yeast spawn, fermenting by performing ventilation stirring for predetermined time, and proliferating yeast", WPI / Thomson, Sep. 8, 2005, vol. 2005, Nr:64, Sep. 8, 2005, abstract.

* cited by examiner

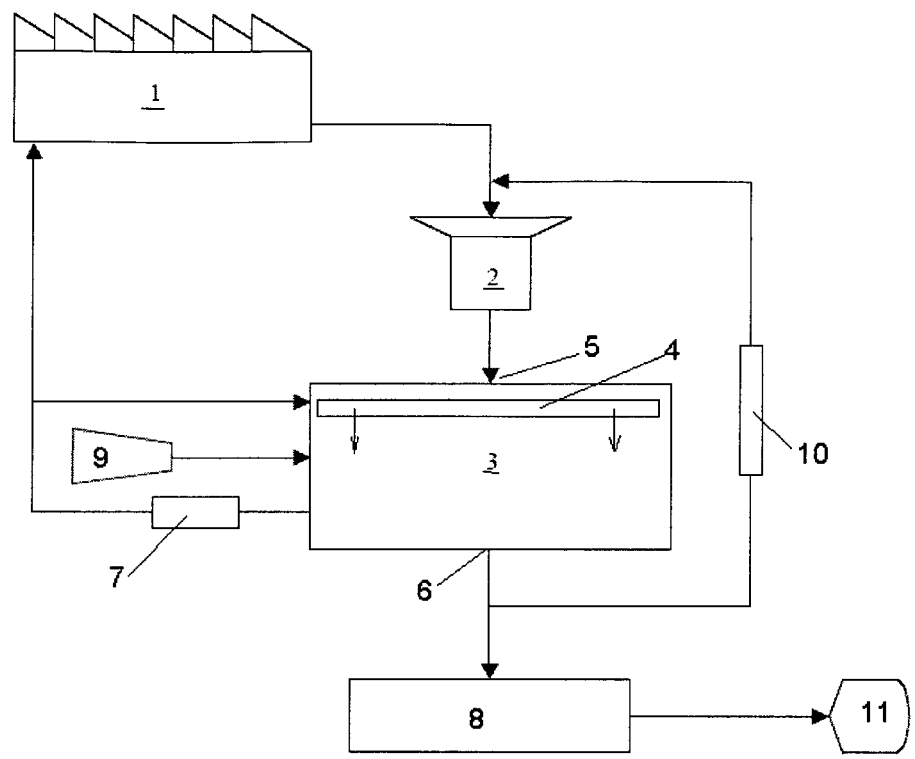

PROCESS AND A PLANT FOR OXIDATIVE BIOSTABILIZATION OF CITRUS PULP

TECHNICAL SECTOR OF THE INVENTION

The present invention relates to a process and a system for valorization of the by-products of citrus industry for the production of juices (oranges, tangerines, grapefruits, lemons, etc.) and/or citrus fruit destined for pulping.

More in particular, the invention regards a process and a system for the treatment of a by-product of the citrus-juice industry, generally constituted by peel, flesh, and seeds and commonly referred to as "citrus pulp".

By way of example, citrus pulp generally presents the characteristics appearing in Table 1 below.

TABLE 1

Characterization of citrus pulp

| Parameter | Unit | Orange pulp |
|---|---|---|
| humidity | % | 82-89 |
| pH | | 3.2-4.2 |
| dry substance | % | 16-18 |
| ashes | % | 0.5 |
| Brix° | °Bx | 8-13 |
| Energy value | kcal/100 g | 67 |
| Energy value | kJ/100 g | 286 |
| Total organic C | % (C) d.s. | 42-46 |
| Total N | % (N) d.s. | 1.0-2.5 |
| $P_2O_5$ | | 0.27 |
| $K_2O$ | | 0.90 |
| salinity | Meq/100 g | 60 |
| Humic and fulvic acids | % | 14-16 |
| C/N ratio | % | 17 |
| Magnesium, Mg | mg/kg | 0.12 |
| Calcium, Ca | mg/kg | 1.1 |
| Copper, Cu | mg/kg | 3-7 |
| Zinc, Zn | mg/kg | 6.3 |
| Lead, Pb | mg/kg | 0.4 |
| Cadmium, Cd | mg/kg | <0.1 |
| Nickel, Ni | mg/kg | 0.5 |
| Mercury, Hg | mg/kg | 0.1 |
| Hexavalent chromium, Cr(VI) | mg/kg | <0.1 |
| *Escherichia coli* | CFU/g | <10 |
| Presumed *Salmonella* spp. | in 25 g | absent |

STATE OF THE ART

Currently known to the art are systems for the treatment of citrus pulp as by-product (corresponding to approximately 50-60 wt % of the fruit processed, with a water content ranging between 82% and 86%) of the seasonal production of citrus juices. The seasonality of the production means that companies working in the citrus-processing sector must find a satisfactory solution for disposal of the pulp either by delivering it to external entities equipped for carrying out seasonal production or by valorizing it internally.

Currently, the most common applications of citrus pulp are:
- use of the pulp as fresh animal feed (external application)—this application is markedly limited by two factors: 1) availability of livestock companies of appropriate size (the pulp must be consumed by the animals within a few days); 2) distance of the receiving company.
- chemical extraction of essential oils—the producing company must be equipped with a system for chemical extraction of the essential oils (principally D-limonene), and then the pulp is made available for anaerobic fermentation for the production of biogases and consequent energy valorization, after prior appropriate dehydration treatment; this solution presents certain critical aspects: considerable investment costs and O&M (operations and maintenance) costs, and high energy costs;
- desiccation or desiccation with extraction of pectins (internal valorization)—the producing company must be equipped with a desiccation system (generally a rotary oven); the desiccated product is then marketed as animal feed or ingredient for human consumption; even though this application is amongst the most widespread, it involves various critical aspects: considerable investment costs; high O&M costs; and very high energy costs, also due to the fact that the level of humidity in the pulp is very high, even higher than 84%;
- disposal—in certain cases, where local legislation so allows, the citrus pulp is disposed of as refuse for incineration or for dumping; in many countries this solution is not allowed by law.

In this context, a known technical problem is represented by the fact that the citrus pulp presents major difficulties in undergoing fermentation processes, whether anaerobic or aerobic.

Anaerobic processes are, in fact, inhibited selectively by a chemical substance normally present in citrus fruits, namely, D-limonene, i.e., 4-isopropenyl-1-methyl-cyclohexene. D-limonene represents the main component (65-91%) of the essential oils present in citrus fruit. The relative composition of monoterpenes affects the antibacterial action of the essential oils against *Staphylococcus aureus, Escherichia coli,* and *Pseudomonas aeruginosa* (Soumaya Bourgou et al., *The Scientific World Journal*, Volume 2012, Art. ID 528593).

Methanogenic bacteria are the ones that are mostly affected by the toxic action of monoterpenic essential oils. From studies conducted by E. Mizuki et al., it emerges that the inhibiting action of D-limonene is exercised starting from a concentration of 58.5 µl/l of inoculum per day, i.e., approximately 0.005 wt %. In citrus pulp, the D-limonene content is approximately one part per thousand, i.e., at least 20 times the minimum concentration at which the inhibiting action on the anaerobic process starts. According to the study by Bourgou cited above, for the other monoterpenes said inhibiting action is exerted at even lower concentrations.

The technologies so far proposed for anaerobic fermentation of homogeneous biomasses of citrus pulp envisage preliminary extraction of the essential oils from the organic substrate after prior treatment in the biodigestor.

One of such systems is known from EP1149805, which describes a process of anaerobic fermentation of the pulp, designed for the production of energy, based upon a pretreatment by dehydration and a step of extraction of essential oils.

In the above system, once the oils are separated from the citrus pulp, the fermentation process may take place with limits in any case linked to the pH. Moreover, the pretreatments (dehydration and extraction of essential oils) involve plant-investment costs and energy costs that render said application not altogether satisfactory.

The processes of aerobic fermentation of the citrus pulp are, instead, inhibited by the acidity, by the high content of humidity, and by the presence of essential oils.

Studies on aerobic fermentation of citrus pulp have been conducted on substrates containing at least 40% of lignocellulose material as structuring agent and corrector of humidity and acidity.

As shown in Table 1, citrus pulp generally has a pH ranging between 3.2 and 4.2 and an amount of essential oils around 0.1%.

PURPOSE OF THE INVENTION

A first purpose of the present invention is hence to provide a process and an apparatus for oxidative biostabilization of citrus pulp that will be free from the aforesaid drawbacks of the known systems described and will enable aerobic fermentation of the biomass without any pre-treatment such as dehydration or extraction of essential oils.

A second purpose of the present invention is to provide a process and an apparatus for treatment of citrus pulp that will enable processing of homogeneous pulp without resorting to macro-additives (structuring agent, humidity corrector, etc.) or micro-additives (pH correctors, antimould agent, etc.), a wide flexibility as regards the type of citrus fruit to be treated (pulp of oranges, tangerines, lemons, grapefruits, etc., and/or their mixtures), optimization of the process parameters, and a reliable repeatability of the results obtained.

A third purpose of the present invention is to provide a continuous process that will be independent of the seasonality of production of citrus fruit and of processing thereof for obtaining juice.

SUMMARY OF THE INVENTION

The above and further purposes are achieved by a process and an apparatus according to one or more of the annexed claims.

According to the invention, the non-pretreated pulp is introduced into an aerobic-process system.

A first advantage of the invention lies in the fact that the process according to the invention enables aerobic fermentation of the biomass without any physical or chemico-physical pre-treatment such as dehydration or extraction of essential oils.

A further advantage lies in the fact that the process and apparatus according to the invention are flexible in use and can be readily optimized according to the type of pulp processed.

Yet a further advantage lies in the fact that the process according to the invention is able to treat a homogeneous fraction of pure citrus pulp as such (100% of the material treated) without mixing it with foreign macro-additives such as lignocellulose structuring agents and/or micro-additives such as pH correctors.

Yet a further advantage lies in the fact that the process is of a continuous type, capable of biostabilizing even citrus pulp seasoned in a simple storage silo. This process peculiarity enables the invention to be implemented so that it operates over the entire solar year, hence irrespective of the seasonality linked to ripening of the fruit and hence to its processing for the production of juices.

Yet a further advantage lies in the fact that the process can be easily integrated in the cycle of treatment of citrus fruit implemented by companies producing citrus juices.

Yet a further advantage lies in the fact that the process does not present pollutant gaseous emissions.

Yet a further advantage lies in the fact that the process does not generate significant osmogenous emissions and hence does not require treatment of the emissions and their conveyance.

Yet a further advantage lies in the fact that the process does not generate percolate, the possible presence of which is, rather, an index of a non-optimal evolution of the aerobic process.

Yet a further advantage lies in the fact that the process makes it possible to obtain as final product of the treatment a variety of homogeneous composted pulp without contaminants foreign to the initial charge, constituted by fresh or seasoned citrus pulp, with multiple applications in the agricultural-commodities sector (quality organic amendment, organic fertilizer, solid fuel, etc.).

Yet a further advantage lies in the fact that the process does not envisage production of waste throughout the production cycle.

Yet a further advantage lies in the fact that the process does not envisage significant consumption of primary resources such as water and thermal and/or electrical energy and hence does not have any environmental impact.

Yet a further advantage lies in the fact that the process is characterized by a high level of simplicity of the system and of the flows of material treated with easy control over the industrial fermentation process.

LIST OF DRAWINGS

The above and further advantages will be better understood by any person skilled in the branch from the ensuing description and the annexed plate of drawings, which is provided purely by way of non-limiting example and in which:

FIG. 1 shows a block diagram of an apparatus for implementation of the process according to the invention.

DETAILED DESCRIPTION

With reference to the attached plate of drawings, a system for implementation of the process according to the invention is now described.

The system comprises an area 1 for collection of the citrus pulp coming, for example, from processes of production of citrus juices or from silos for provisional storage.

From the area 1 an amount of fresh or seasoned citrus pulp P1 per unit time (for example 0.75 m$^3$/h) is continuously fed to a mixer device 2, which mixes the amount P1 with an amount P2 of pulp already partially biostabilized (referred to as "active biostabilized pulp") to obtain a reaction mixture having indicatively a level of humidity H lower than 65%, and a pH higher than 4 that is distributed in a first open-chamber reactor 3 where oxidative biostabilization in air of the mixture takes place.

In an intermediate position along the reactor 3, means 4 are provided for feeding the pulp along said reactor 3, which are constituted, for example, by a mechanical blade turner that causes advance of the reaction mixture along the reactor by a certain amount, for example 2 m, at each pass, with a number of daily passes that depends upon the length of the reactor.

Advantageously, the turner 4, in addition to causing advance of the reaction mixture, guarantees homogenization thereof.

At the bottom, the reactor 3 is provided with means 9 for blowing in air from beneath, which are constituted, for example, by a distribution of nozzles that inject air from beneath upwards so that it traverses the bed of reaction mixture present in the reactor 3 throughout its height. The air-injection device with nozzles preferably extends along the entire reactor, throughout its length and width and can be operated by means of manual or electromechanical valves independently for each meter (for example) of length of the reactor.

Periodically, the valves can thus be closed, individually and in a staggered way, so as to interrupt blowing-in of air into a given portion of the length of the reactor. Said operation enables exit through a draining system of possible percolate that lies on the bottom of the reactor and that is an index of a non-optimal process.

Indicatively, the percolate may present a pH of approximately 3.5-4.0 and a sugar content expressed in degrees Brix of 8.5-12° Bx.

Once the possible percolate has been expelled, it is possible to re-open the valves for restarting blowing-in of air into that portion of reactor. The same operation is repeated on another contiguous and subsequent portion of reactor towards the outlet of the reactor. Preferably, the draining system is constituted by the air-delivery ducts themselves appropriately controlled by suction systems. Advantageously, use of one and the same duct for blowing in air and discharging the percolate simplifies the structure of the reactor and prevents onset of clogging of the discharge ducts.

According to the invention, means for mechanical movement 10, for example, of the blade or auger type, are provided for transferring cyclically a mass P2 of active biostabilized pulp from an intermediate area of the reactor 3 or an area downstream of the outlet end 6 to an area upstream of the mixer 2.

In this way, the mixture obtained is recirculated by the combined action of the means for causing advance of the pulp and the transfer means 10 until the final product of the reaction is obtained, constituted by active biostabilized pulp.

Preferably, but without this implying any limitation, the transferred mass P2 is comprised between 0.7 times the amount P1 and 1.3 times the amount P1, possibly varying according to the type of citrus fruit and the chemico-physical characteristics of the fresh pulp, in particular humidity and pH.

Advantageously, the active biostabilized pulp obtained with the process according to the invention has a dual function of structuring agent and of specific catalyst of the aerobic fermentation without any need, in steady-running conditions, to inject additional structuring agents or catalysts.

In the framework of the present description, by "active biostabilized pulp" is meant a product obtained by oxidative biostabilization of citrus pulp, indicatively presenting the following characteristics: acidity: $6<pH<8$; Potential Dynamic Respiration Index: $500<DRI<1000$ $mgO_2/kgSV/h$; and humidity: $H<40\%$.

Different values of the characteristics may possibly reduce functional effectiveness.

In a preferred example of embodiment of the process, the time of stay of the reaction mixture in the reactor 3, for example in a reactor having a length of 60 m, is approximately 4-8 days according to the type of citrus fruit and the chemico-physical characteristics of the fresh pulp, in particular the initial content of sugars, essential oils, and humidity.

In the example described, the temperature of the initial reaction mixture is approximately 35° C.; after about 3-4 days, it may reach temperature peaks close to 80° C. and then drop to around 50° C.

Since to the increase in temperature there generally corresponds a reduction of the acidity and humidity of the reaction substrate, in the case where in the final step of the process the humidity of the substrate or reaction mixture were to drop below 40%, it is envisaged to operate a system for sprinkling that portion of substrate so as to bring the humidity back to approximately 45%.

Preferably, for control of the humidity the percolate that may have formed in the initial part of the reactor is primarily used; otherwise, the percolate formed in the storage silo is used.

Finally present downstream of the outlet end 6 of the first reactor 3 is a second reactor 8 for maturing the active biostabilized pulp fed in and possibly means 11 for unloading and packaging the pulp matured in the second reactor 8.

Preferably, the resilience time, understood as time of stay of the active biostabilized pulp in the maturing reactor 8, must be sufficient to achieve a stabilization such as to have a $DRI<500$ $mgO_2/kgSV/h$ and a humidity $H<40\%$.

By way of indication, the resilience time necessary for guaranteeing that the above parameters will be respected is not longer than 30 days, after which the pulp is stored in heaps covered by a roof or semipermeable sheeting that protects the active biostabilized pulp from penetration of water from outside, but at the same time enables exit of $CO_2$ and water vapour from the substrate towards the outside.

The system described above consequently operates according to the following steps in combination:
  feeding an amount of fresh citrus pulp, preferably continuously;
  mixing the fresh pulp with active biostabilized pulp to obtain a reaction mixture;
  setting the reaction mixture in the first reactor 3;
  causing the mixture to advance along the reactor 3;
  blowing in air from beneath into the first reactor 3;
  extracting from the reactor 3 by draining any possible percolate in aqueous phase and possibly recirculating the percolate for control of the humidity of the mixture; and
  transferring a partial mass of the active biostabilized pulp from an intermediate area or an area downstream to an area upstream of the mixer of the reactor 3 to enable the mixer to mix the fresh pulp coming from the juice-production cycle or the seasoned pulp coming from the storage silo with the active biostabilized product obtained in an intermediate portion or downstream of the reactor 3.

The remaining non-recycled part of active biostabilized pulp is transferred into a second reactor for slow maturing, from which the final product is obtained.

Advantageously, the process according to the invention renders possible progress of the aerobic process carried out on the pulp and hence its transformation into an exploitable industrial product constituted by the active biostabilized pulp available in an intermediate area or downstream of the first reactor 3, so that also the active biostabilized pulp is considered an end product and can be marketed for uses, that are similar to those described in the present disclosure, in other aerobic-fermentation processes.

In particular, the main characteristics of the process are:
  recycling or recirculation of a part of the active biostabilized product at output from the reactor 3 before the maturing step; this portion of active biostabilized pulp functions in fact, at input to the reactor 3, as structuring element and imparts porosity on the mass of pulp treated, favouring circulation of air in the biomass; moreover, the mass of pulp recirculated acts as corrector of humidity in so far as it brings the overall average humidity H to values lower than 65% thus optimizing the kinetics of fermentation, in addition to acting as catalyst, in so far as it transfers its own microbiological content (namely, those microbes resistant to the toxic and fermentation-inhibiting action of essential oils such as D-limonene) to the pulp, thus accelerating the process of fermentation thereof; in particular, the recirculation of the mass of active biostabilized pulp significantly reduces the times of fermentation of mesophilic bacteria, favouring the colonies of thermophilic bacteria; the latter accelerate fermentation with enormous production of $CO_2$ and $H_2O$, which, thanks to the high temperature, abandon the substrate in aeriform phase;

mechanical turning of the mass of pulp, which renders the temperature thereof uniform and guarantees chemico-physical homogeneity thereof;

forced aeration of the mass of pulp in the reactor 3, which favours the reactions of oxidation and facilitates removal of humidity and $CO_2$ that is formed by oxidative fermentation; and extraction of the percolate; removal of the possible percolate that forms in the first days of fermentation enables a control of the humidity below the level of 65%.

The invention moreover regards the biostabilized citrus pulp obtained as a result of the process downstream of the first biostabilization reactor 3.

Appearing in the table below by way of preferred example is the agronomic characterization of a product of oxidative biostabilization of citrus pulp obtained with the process according to the invention.

The product the invention, according to the production recipe followed, moreover falls within the characteristics of green solid fuel in so far as it presents a calorific power of approximately 12 kJ/kg, i.e., the same as dry wood. Moreover, it presents at least two aspects of environmental sustainability: it is the result of valorization of a by-product; and any potential pollutants deriving from combustion (sulphur, heavy metals, etc.) are absent. Given in the table below is the calorimetric characterization of a biostabilized product obtained according to the invention starting from seasoned pulp of red oranges of Sicily.

| | |
|---|---|
| Higher Heat Value (HHV) | 13.648 kJ/kg |
| Lower Heat Value (LHV) | 12.470 KJ/kg |
| Water | 19.9 wt % |
| Hydrogen | 5.60 wt % |
| Sulphur | <0.10 wt % |

The present invention has been described according to preferred embodiments, but equivalent variants may be devised without thereby departing from the sphere of protection of the invention.

The invention claimed is:

1. A process for oxidative biostabilization of citrus pulp, said process comprising the steps of:

feeding an amount of fresh citrus pulp per unit time to a mixer device;

| AGRONOMIC CHARACTERIZATION | | | | |
|---|---|---|---|---|
| Parameter | Result | Unit | Method | N.V. pursuant to Leg. Decree 75-2010 Att. 2 |
| humidity | 35.33 | % | ANPA Manual 3/2001 | Max 50 |
| pH | 8.05 | /// | ANPA Manual 3/2001 | 6-8.5 |
| Total organic carbon | 40.70 | % d.s. | Official Gazette No. 21, Jan. 26, 2001, Supplement 6 | Min 20 |
| Organic substance | 70.17 | % d.s. | Official Gazette No. 21, Jan. 26, 2001, Supplement 6 | /// |
| Assimilable phosphorus | 0.05 | % d.s. | Official Gazette No. 21, Jan. 26, 2001, Supplement 6 | /// |
| Total phosphorus ($P_2O_5$) | 0.74 | % d.s. | Official Gazette No. 21, Jan. 26, 2001, Supplement 6 | /// |
| Total nitrogen (N) | 7.64 | % d.s. | Official Gazette No. 21, Jan. 26, 2001, Supplement 6 | /// |
| Total potassium ($K_2O$) | 2.02 | % d.s. | Official Gazette No. 21, Jan. 26, 2001, Supplement 6 | /// |
| C/N | 10.7 | % d.s. | /// | Max 25 |
| Content of plastic materials, glass, and metals | <0.1 | % | ANPA Manual 3/2001 | 0.5 |
| Lithoid inert materials | <1 | % d.s. | ANPA Manual 3/2001 | 5 |
| Total chromium(VI) | <0.01 | mg/kg d.s. | ANPA Manual 3/2001 | 0.5 |
| Copper | 41.1 | mg/kg d.s. | ANPA Manual 3/2001 | 230 |
| Total mercury | <0.5 | mg/kg d.s. | ANPA Manual 3/2001 | 1.5 |
| Lead | 6.97 | mg/kg d.s. | ANPA Manual 3/2001 | 140 |
| Cadmium | 0.14 | mg/kg d.s. | ANPA Manual 3/2001 | 1.5 |
| Zinc | 302.0 | mg/kg d.s. | ANPA Manual 3/2001 | 500 |
| Nickel | 8.7 | mg/kg d.s. | ANPA Manual 3/2001 | 100 |
| Manganese | 114.2 | mg/kg d.s. | ANPA Manual 3/2001 | /// |
| Iron | 4.1 | mg/kg d.s. | ANPA Manual 3/2001 | /// |
| Calcium | 1.36 | % d.s. | ANPA Manual 3/2001 | /// |
| Magnesium | 0.2 | % d.s. | ANPA Manual 3/2001 | /// |
| Sodium | 0.09 | % d.s. | ANPA Manual 3/2001 | /// |
| Cation-exchange capacity | 139.6 | /// | ANPA Manual 3/2001 | /// |

Advantageously, the chemico-physical analysis shows that the product according to the invention falls within the characteristics required for use as nitrogenous organic fertilizer, preferably with a nitrogen content higher than 7%.

mixing said amount of fresh pulp with an amount of active biostabilized pulp to obtain a reaction mixture;

transferring the reaction mixture to a first open-chamber reactor for oxidative biostabilization in air of the reaction mixture;

advancing said reaction mixture by means of a turner along said first reactor between a first end and a second end of said first reactor;

blowing in air from beneath, into said first reactor to produce active biostabilized pulp; and cyclically transferring a partial amount of the active biostabilized pulp from an intermediate area of said first reactor or an area downstream of said second end to an area upstream of said mixer.

2. The process according to claim 1, wherein said amount of active biostabilized pulp is comprised in a value of between 0.7 and 1.3 times (in weight) said amount of the fresh pulp fed into said mixer, and wherein said active biostabilized pulp presents the following characteristics: acidity: 6<pH<8; Potential Dynamic Respiration Index (DRI): 500<DRI<1000 mgO$_2$/kgSV/h; humidity: H<60%.

3. The process according to claim 1 or claim 2 further comprising a step of maturing a mass of the active biostabilized pulp in a second reactor.

4. The process according to claim 1 or claim 2 further comprising a step of controlling humidity and/or temperature of the reaction mixture in one or more areas of said first reactor.

5. A citrus pulp biostabilized by oxidation, said citrus pulp presenting the following characteristics:
acidity: 6<pH<8;
Potential Dynamic Respiration Index: DRI<500 mgO$_2$/kgSV/h; and
humidity: H<40%;
wherein said citrus pulp is biostabilized by the process comprising the steps of:
feeding an amount of fresh citrus pulp per unit time to a mixer device;
mixing said amount of fresh pulp with an amount of active biostabilized pulp to obtain a reaction mixture;
transferring the reaction mixture to a first open-chamber reactor for oxidative biostabilization in air of the reaction mixture;
advancing said reaction mixture by means of a turner along said first reactor between a first end and a second end of said first reactor;
blowing in air from beneath, into said first reactor to produce active biostabilized pulp; and
cyclically transferring a partial amount of the active biostabilized pulp from an intermediate area of said first reactor or an area downstream of said second end to an area upstream of said mixer.

6. The citrus pulp according to claim 5, wherein said active biostabilized pulp is a nitrogenous organic fertilizer in solid form.

7. The citrus pulp according to claim 5, wherein said active biostabilized pulp is a fuel in solid form, said fuel presenting the following characteristics: Lower Heat Value (LHV) of approximately 12 MJ/kg; and absence of sulphur (S<0.1%).

8. An active citrus pulp biostabilized by oxidation, said active citrus pulp presenting the following characteristics: acidity: 6<pH<8; Potential Dynamic Respiration Index: 500<DRI<1000 mgO$_2$/kgSV/h; humidity: H<60%.

9. The active citrus pulp according to claim 8, wherein said active biostabilized pulp is a structuring agent in oxidative-fermentation processes or in composting.

10. The active citrus pulp according to claim 8, wherein said active biostabilized pulp is a kinetic activator or a catalyst of oxidative-fermentation processes in composting.

11. The active citrus pulp according to claim 8, wherein said active biostabilized pulp is a humidity and acidity corrector in oxidative fermentation processes or in composting.

12. A system for oxidative biostabilization of citrus pulp, said system comprising:
a mixer having a configuration capable of mixing a mass of fresh pulp with a mass of active biostabilized pulp to obtain a reaction mixture;
a first open-chamber reactor having a configuration capable of oxidative biostabilization in air of the reaction mixture, said first reactor being provided with a first inlet end in communication with said mixer and a second end for outlet of active biostabilized pulp;
a mechanical blade turner associated within said reactor, said turner having a configuration capable of feeding the reaction mixture along said reactor between said first end and said second end;
a blower having a configuration capable of blowing air into said first reactor from beneath; and
a mechanical movement device having a configuration capable of transferring a partial mass of the active biostabilized pulp from an intermediate area of said first reactor or an area downstream of said second end, to an area upstream of said mixer.

13. The system according to claim 12 further comprising means for control and reintegration of humidity of the reaction mixture.

14. The system according to claim 12 or claim 13 further comprising a second reactor in communication with said outlet of said first reactor, said second reactor having a configuration capable of maturing the active biostabilized pulp from said first reactor.

15. The system according to claim 12 further comprising means for unloading and packaging pulp matured in said second reactor.

* * * * *